United States Patent [19]

Takeda et al.

[11] Patent Number: 4,871,994
[45] Date of Patent: Oct. 3, 1989

[54] ALARM APPARATUS FOR AUTOMATIC TRANSMISSION VEHICLE

[75] Inventors: Yoshimitsu Takeda, Zama; Haruo Mochida, Kanagawa; Tsutomu Iwasaki, Yokohama; Toshio Kanai, Ayase, all of Japan

[73] Assignee: Nissan Motor Co., Ltd., Yokohama, Japan

[21] Appl. No.: 221,797

[22] Filed: Jul. 20, 1988

[30] Foreign Application Priority Data

Jul. 21, 1987 [JP] Japan ................................. 62-182020
Jul. 21, 1987 [JP] Japan .......................... 62-111611[U]

[51] Int. Cl.$^4$ ............................................. B60Q 1/00
[52] U.S. Cl. .................................. 340/457; 340/457.3; 200/61.88
[58] Field of Search .................. 340/52 R, 52 D, 457, 340/457.3; 307/10 R, 10 AT, 10.1, 10.3, 10.6; 200/61.88, 61.91, 61.87; 180/271

[56] References Cited

U.S. PATENT DOCUMENTS

| | | |
|---|---|---|
| 4,380,752 | 4/1983 | Reynolds ........................... 340/52 D |
| 4,427,967 | 1/1984 | Maiocco ........................... 340/52 D |
| 4,473,141 | 9/1984 | Mochida ........................... 340/52 D |
| 4,482,885 | 11/1984 | Mochida ........................... 340/52 D |
| 4,495,484 | 1/1985 | Kawakatsu et al. .............. 340/52 D |
| 4,513,276 | 4/1985 | Kubota et al. .................... 340/52 D |

FOREIGN PATENT DOCUMENTS 62-20343 5/1987 Japan .

Primary Examiner—Donnie L. Crosland
Attorney, Agent, or Firm—Foley & Lardner, Schwartz, Jeffery, Schwaab, Mack, Blumenthal & Evans

[57] ABSTRACT

To prevent an automatic transmission vehicle from creeping when the engine is started with the shift lever set to Neutral position, an alarm is produced when the shift lever is set to shift positions other than Park position and simultaneously the ignition key is removed from the ignition key cylinder or inserted into the ignition key cylinder at engine halt. Therefore, whenever the driver removes the ignition key from the ignition key cylinder or inserts the ignition key into the ignition key cylinder at engine halt, the driver is forced to securely set the shift lever to Park position on the alarm signal.

2 Claims, 5 Drawing Sheets

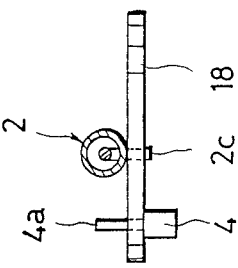
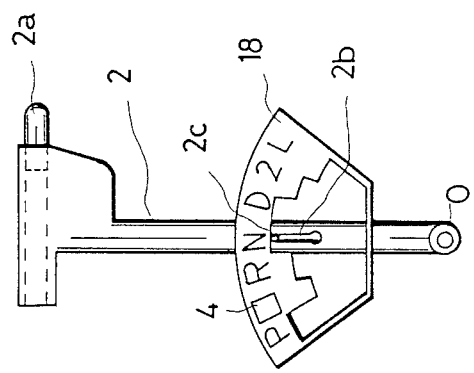

ALARM APPARATUS FOR AUTOMATIC TRANSMISSION VEHICLE

BACKGROUND OF THE INVENTION

1. Field of the Invention

The present invention relates to an alarm apparatus for an automatic transmission vehicle and, more specifically, to an alarm apparatus for preventing the vehicle from creeping when the engine is started.

2. Description of the Prior Art

An automatic transmission is usually provided with various ranges of Park (P) position, Reverse (R) position, Neutral (N) position, Drive (D) position, Second (2) position and low (L) position. The magnitude of power transmitted from an engine to the vehicle's wheels changes according to the shift position to which the shift lever is set. Further, the engine can be started only at P or N position, at which engine power is not directly transmitted to the vehicle wheels.

To drive an automatic transmission vehicle, usual the driver first starts the engine and shifts the shift lever from P position to one of drive positions (e.g. D position) while depressing the foot brake, as disclosed in Japanese Published Examined (Kokoku) Patent No. 62-20343, for instance.

However, in case the driver sets the shift lever from P position to D position without applying the brake to the vehicle, there exists a problem in that the vehicle starts at a low speed, due to the so-called creep phenomenon.

To overcome this creep phenomenon, a shift lever locking mechanism has been proposed such that the shift lever is locked at the P position, when the driver does not actuate the foot brake or the parking brake, to prohibit the shift lever from beign set to another shift position.

In the prior-art shift lever lockingn mechanisms, however, since this locking mechanism is not operative or disabled when the engine is started with the shift lever set to N position, the driver may set the shift lever from N position to one of drive positions without applying the brake to the vehicle, thus still resulting in a problem, in that it is impossible to perfectly prevent the creep phenomenon.

SUMMARY OF THE INVENTION

With these problems in mind, therefore, it is the primary object of the present invention to provide an alarm apparatus for an automatic transmission vehicle which can securely prvent the vehicle from creeping upon the starting of the engine.

To achieve the above-mentioned object, an alarm apparatus for an automatic transmission vehicle provided with a shift lever, and an ignition key inserted into a key cylinder, according to the present invention comprises: (a) lever position detecting means for detecting whether the shift lever is set to Park position; (b) key removal detecting means for detecting whether the ignition key is removed from the key cylinder; (c) control means, coupled to said lever position detecting means and said key removal detecting means, for generating an alarm signal when said lever position detecting means detects that the shift lever is not set to Park position and said key removal detecting means detects that the ignition key is removed from the key cylinder; and (d) alarm generating means, coupled to said control means, for producing an alarm in response to the alarm signal generated from said control means.

In the alarm apparatus of the present invention, when the shift lever is set to shift positions other than Park position and simultaneously the ignition key is removed from the ignition key cylinder or inserted into the ignition key cylinder at engine stop, an alarm is produced. Therefore, whenever removing the ignition key from the ignition key cylinder or inserting the ignition key into the ignition key cylinder at engine stop, the driver is forced to shift the shift lever to Park position on the alarm signal, so that it is possible to securely prevent the automatic transmission vehicle from creeping caused when the engine is started with the shift lever set to Neutral position.

BRIEF DESCRIPTION OF THE DRAWINGS

FIG. 3 is a front view showing an example of a shift lever for an automatic transmission vehicle;

FIG. 4 is a top view showing the shift lever shown in FIG. 3;

DETAILED DESCRIPTION OF THE PREFERRED EMBODIMENS

Figure 1:
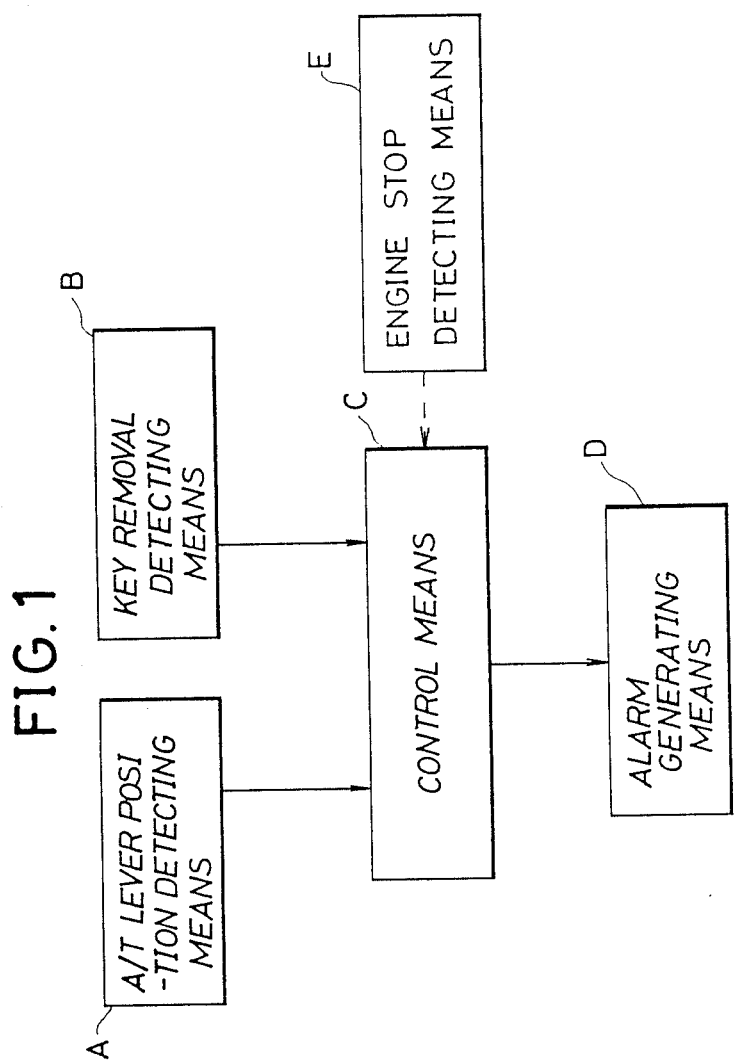
FIG. 1 is a block diagram showing a basic configuration of the alarm apparatus for an automatic transmission vehicle according to the present invention.

FIG. 1 shows a basic block diagram of the alarm apparatus for an automatic transmission vehicle according to the present invention, which comprises automatic transmission (A/T) lever position detecting means A for detecting whether a shift lever is set to Park position; key removal detecting means B for detecting whether an ignition key is removed from an ignition key cylinder; control means C for generating an alarm signal when the shift lever is set to positions other then Park position and simultaneously when the ignition key is removed from the key cylinder; and alarm generating means D for producing an alarm to the driver in response to the alarm signal.

Figure 2:
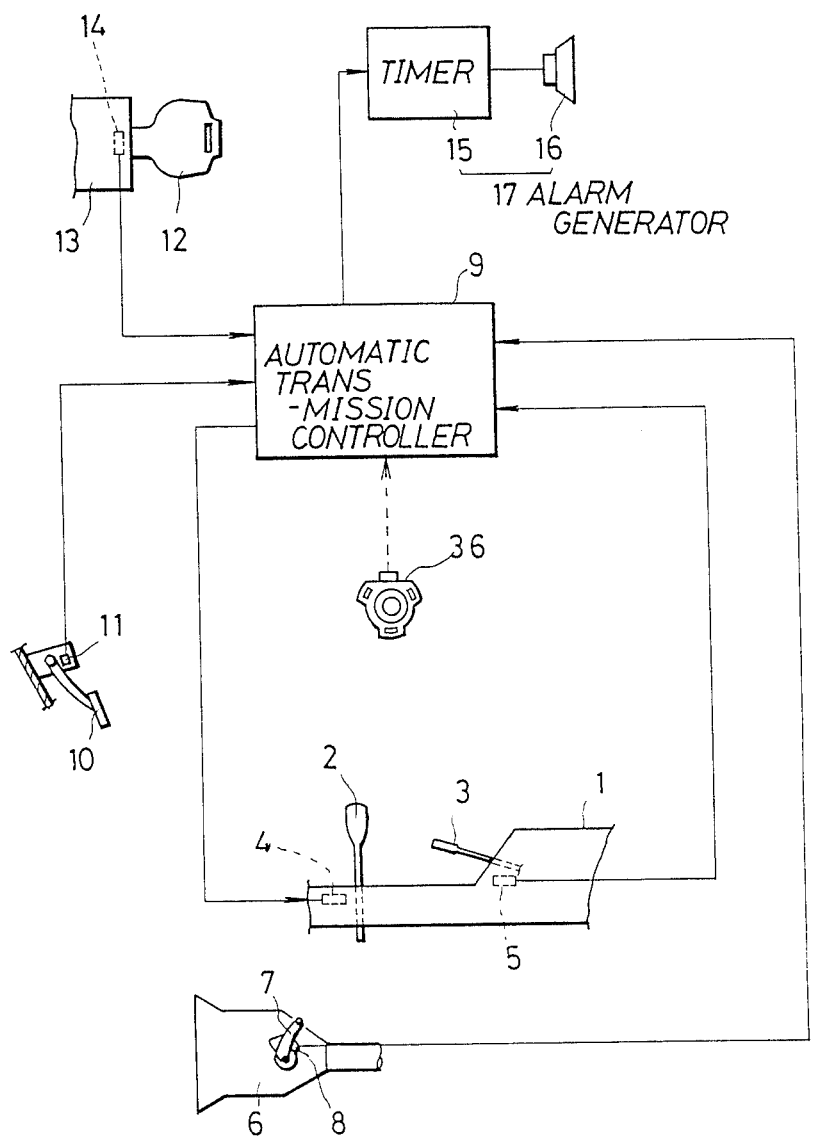
FIG. 2 is a block diagram including diagrammatical view for explaining the embodiments of the alarm apparatus according to the present invention.

FIG. 2 shows an embodiment of the alarm apparatus according to the present invention in combination with a shift lever locking mechanism.

For a central console 1 of an automatic transmission vehicle, there are provided a shift lever 2, a parking brake lever 3, a solenoid 4 for locking the shift lever 2, and a parking brake switch 5 turned on when the parking brake lever 3 is actuated (pulled upward) but off when released. Further, this shift lever 2 is linked with a range select arm 7 of a transmission 6 via a link mechanism (not shown). Therefore, shift positions of this range select arm 7 corresponding to those of the shift lever 2 can be detected by an inhibitor switch 8 (shift lever position detecting means A).

The solenoid 4, the parking brake switch 5 and the inhibitor swithc 8 of the shift lever locking mechanism are all connected to an automatic transmission controller 9 (control means C). A foot brake switch 11 turned on or off when a foot brake pedal 10 is depressed or released, a key switch 14 (key removal detectingn means B) for detecting whether an ignition key 12 is inserted into or removed from a key cylinder 13, and a timer circuit 15 (e.g. a monostable multivibrator) and a buzzer 16 (Alarm generating means D or 17) are connected to this controller 9.

FIG. 3 shows the shift lever 2, in which the shift lever 2 pivotable about an axle 0 is shiftable to six positions: P (Park), R (Reverse), N (Neutral), D (Drive), 2 (2nd), and L (Low). This shift lever 2 is provied with a knob button 2a and a detent pin 2c urged upward by a spring (not shown) along a slot 2b. Therefore, when the knob button 2a is pushed into the knob, the detent pin 2c is moved downward for allowing the shift lever to be shifted freely. The engagement relationship between the detent pin 2c and a detent panel 18 fixed to the vehicle body is as follows: the shift lever 2 can be shifted between P and R, from n to R, from d to 2, and from 2 to L only when the knob button 2a is depressed, but can be shifted freely from R to N, between N and D, from L to 2, and from 2 to D even when the knob button 2a is not depressed.

As shown in FIG. 4, the solenoid 4 constituting the shift lever locking mechanism is mounted on the detent panel 18 on the front surface thereof opposite to the reverse surface thereof on which the shift lever 2 is pivoted. This solenoid 4 moves a pin 4a ouward when energized in response to a signal supplied from the automatic transmission controller 9 in order to limit the shift of the shift lever 2 from P position. That is, since the pin 4a ofo the solenoid 4 is located between P and R positions, when htis pin 4a projects, even if knob button 2a is depressed, it is impossible to shift the shift lever 2 set to P position to another position.

Figure 5:
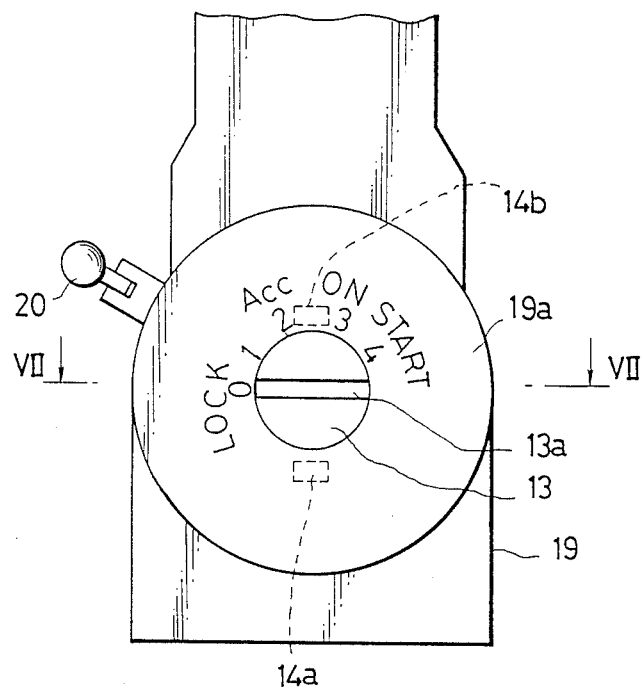
FIG. 5 is an enlarged plan view showing an ignition switch incorporated in an ignition key cylinder.
Figure 6:
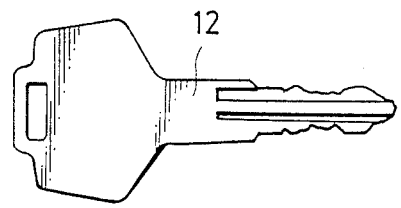
FIG. 6 is a plan view showing an ignition key.

FIG. 5 shows an ignition switch 19 including a key cylinder 13, in which a key insertion slot 13a (to which a key cylinder 13 in inserted) is exposed from an opening formed in a circular cover 19a of the ignition switch 19. When an ignition key 12 as shown in FIG. 6 is inserted into this slot 13a and then pivoted, it is possible to change wiring conditions of an electric circuit and locking conditions of a handle of the automatic vehicle. In the ignition switch 19 shown in FIG. 5, the key can be stopped at five click positions of "LOCK 0", "Acc 2", "ON 3", and "START 4" in order along the clockwise direction.

At "LOCK 0", thet key 12 can be inserted or removed. Once the key 12 is removed, the handle is locked. When the key 12 is pivoted to "1", the handle is unlocked. When the key 12 is pivoted to "Acc 2", power is supplied to accesories (e.g. radio set, cassette, cigarette lighter, etc.). At "ON 3", the engine switch is turned on). At "START 4", a starter motoro can be actuated to start the engine. Further, the key 12 can be pivoted from "Acc 2" to "LOCK 0" only when a push button 20 is kept depressed. whenthe key 12 is released at "START 4", the key 12 is returned to "ON 3" automatically.

Figure 7:
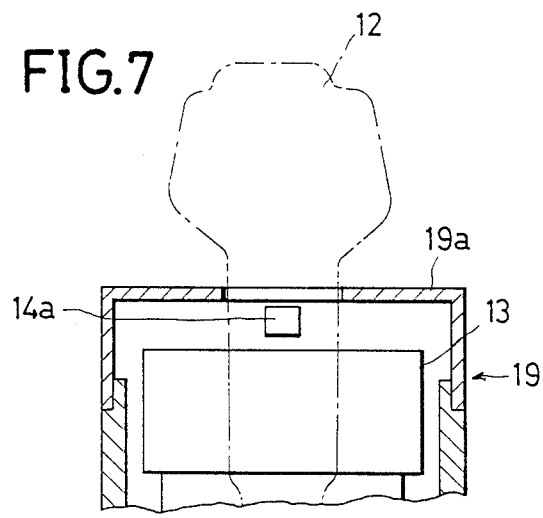
FIG. 7 is a cross-section view taken along the line VII—VII in FIG. 5.

The key switch 14 composed of a light emitting element 14a and a light receiving element 14b is provided for the ignition switch 19, as shown by dashed lines in FIG. 5, between the circular 19, as shown by dashed lines in FIG. 5, bettween the circular cover 19a and the key cylinder 13, as shown in FIG. 7. Therefore, when the ignition key 12 is inserted into the key cylinder 13, since the light path between the light emitting element 14b and the light receiving element 14b is shut off, the output of the light receiving element 14b changes to an L-voltage level. However, when ignition key 12 is removed from the key cylinder 13, since the light emitted from the light emitting element 14a is received by the light receiving element 14b, the output of the light receiving element 14b changes to an H-voltage level.

The function and the operation of the automatic transmission controller 9 will be described hereinbelow. This automatic transmission controller 9 is a single-chip microcomputer, for instance, for controlling both shift lever locking function and alarm signal generating function.

As already described, the parking bake switch 5, the inhibitor switch 8, the foot brake switch 11, and the key switch 14 are connected to the automatic transmission controller 9 as elements for inputting information. Further, the solenoid 4 and the alarm generator 17 are connected to the same controller 9 as elements to be controlled.

(1) When the controller 9 determines that the shift lever 2 is set to P position on the basis of a switch signal from the inhibitor switch 8 and further no brake is applied because the parking brake switch 5 and the foot brake switch 11 are both turned off, the controller 9 energizes the solenoid 4 to project the pin 4a for shift lever locking operation, so that the shift lever 2 set to P position is locked without being shifted to any position. That is, the driver cannot shift the shift lever 2 from P position to another position when he does not apply brake to the vehicle, thus preventing an erroneous operation of the driver when the shift lever 2 is set to P position.

(2) When the controller 9 determines that the shift lever 2 is set to positions other than P position on the basis of switch signals from the inhibitor switch 8 and futher the ignition key 12 is removed from the key cylinder 13 (the key switch 14 outputs an H-level signal), the controller 9 generates an alarm generating signal to the timer circuit 15 of the alarm generator 17. In response to this alarm generating signal, the timer circuit 15 generates a driving signal to the buzzer 16 for a predetermined time duration in order to produce an alarm so that the driver is forced to shift the shift lever 2 to P position.

That is, an alarm will be produced when the shift lever 2 is set to positions other than P position and further the ignition key 12 is removed after the engine has been stopped or when the shift lever 2 is shifted from P position to another position before the engine is started or the ignition key 12 is not yet inserted into the ignition switch 19.

Under the conditions as described above, there exists a possibility that the engine will be started with the shift lever 2 set to N position. In this case, the shift lever locking mechanism is disabled as already explained. However, since an alarm is produced, the driver is forced to set the shift lever 2 to P position. When the driver returns the shift lever 2 to P position in response to this alarm, since the shift lever locking mechanism operates, it is possible to securely prevent the vehicle from creeping.

In the above embodiment, a buzzer is used for the alarm generator. Without being limited thereto, however, it is of course possile to use other alarming means such as a tape recorder (voice alarm such as "please return the lever to Park positions"), a flash lamp (light alarm), etc. Further, as means for detecting the presence or absence of an ignition key, it is of course possible to use a microswitch actuated by an end of the ignition key inserted into the key cylinder, instead of a pair of light emitting and receiving elements.

Figure 8:
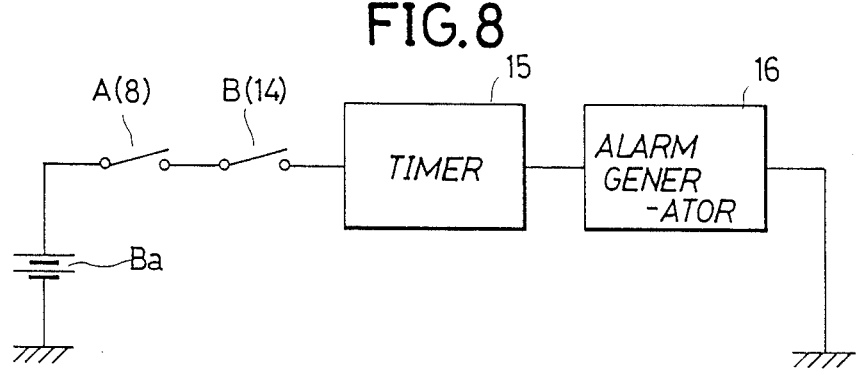
FIG. 8 is a block diagram showing another embodiment of the alarm apparatus according to the present invention.

FIG. 8 shows a second embodiment of the alarm apparatus for an automatic transmission vehicle. In this embodiment, the automatic transmission lever position detecting means A (i.e. the inhibitor switch 8) and the key removal detecting means B (i.e. ignition key switch 14) and the alarm generating means D (i.e. the timer circuit 15 and the alarm generator 16) are connected in series with a battery Ba, without providing the controller. In this embodiment, the shift lever locking function is omitted.

With reference to FIGS. 1 and 2 again, a third embodiment of the alarm apparatus for an automatic transmission vehicle will be described hereinbelow. In this embodiment, an engine stop detecting means E is additionally connected to the control means C of the first embodiment shown in FIG. 1. That is, an engine speed sensor 36 which functions as the engine stop detecting means E is additionally connected to the automatic transmission controller 9 of the first embodiment shown in FIG. 2.

In this third embodiment, when the controller 9 determines that the shift lever 2 is set to positions other than P position on the basis of switch signals from the inhibitor switch 8; the ignition key 12 is not removed from (kept inserted into) the key cylinder 13 (the key switch 14 outputs an L-level signal); and further the engine speed sensor 36 detects engine stop, the controller 9 generates an alarm generating signal to the timer circuit 15 of the alarm generator 17. In response to this alarm generating signal, the timer circuit 15 generates a driving signal to the buzzer 16 for a predetermined time duration in order to produce an alarm so that the driver is forced to shift the shift lever 2 to P position before starting the engine by the ignition key 12 already inserted into the key cylinder 13. That is, an alarm will be produced when the key is inserted into the key cylinder for engine starting with the shift lever 2 kept shifted to positions other than P position.

As already explained, there exists a possiblity that the engine is started with the shift lever 2 set to N position. In this case, the shift lever locking mechanism is disabled. However, since an alarm is produced, the driver is forced to set the shift lever 2 to P position. When the driver returns the shift lever 2 to P position with the ignition key 12 kept inserted in the key cylinder 13 in response to his alarm, since the shift lever locking mechansim operates, it is possible to securely prevent the vehicle from creeping.

As described above, in the alarm apparatus according to the present invention, since an alarm signal can be produced only when the shift lever is set to shift positions other than Park position and simultaneously the ignition key is removed from or inserted into the ignition key cylinder at engine stop, the driver is forced to shift the shift lever to Park position by the alarm signal before starting the engine. Therefore, it is possible to prevent the automatic transmission vehicle from creeping caused when the engine is started with the shift lever set to Neutral position.

What is claimed is:

1. An alarm apparatus for an automatic transmission vehicle, comprising:
   a shift lever;
   an ignition key for inserting into a key cylinder;
   a lever positionn detecting means for detecting whether the shift lever is set to the Park position;
   a key removal detecting means for detecting whether the ignition key is removed from the key cylinder;
   an engine stop detecting means for detecting whether an engine is at a stop;
   a control means, coupled to said lever position detecting means, said key removal detecting means and said engien stop detecting means, for generating an alarm signal when said lever position detecting means detects that the shift lever is not set to Park position and said key removal detecting means detects that the ignition key is removed from the key cylinder, and also whens aid lever position detecting means detects that the shift lever is not set to Park position, and key removal detecting means detects that the ignition ke yis not removed from the key cylinder, and said engine stop detecting means detects that the engine is at a stop; and
   alarm generating means, coupled to said control means, for producing an alarm in response to the alarm signal generated from said control means.

2. The alarm apparatus of claim 1, which further comprises shift lever locking means including:
   brake detecting means, coupled to said control means, for detecting whether brake is applied to the automatic transmission vehicle; and
   detent actuating means, coupled to said controller, for actuating a detent to lock the shift lever in response t a shift lever lock signal generated from said controller when said lever position detecting means detects that the shift lever is set to Park position and said brake detecting means detects that brake is not applied to the automatic vehicle.

* * * * *